Patented Nov. 19, 1929

1,735,924

UNITED STATES PATENT OFFICE

EMMET F. HITCH AND HENRY JORDAN, OF WILMINGTON, DELAWARE, ASSIGNORS TO E. I. DU PONT DE NEMOURS & COMPANY, OF WILMINGTON, DELAWARE, A CORPORATION OF DELAWARE

AZO DYE AND PROCESS OF PREPARING SAME

No Drawing. Application filed October 9, 1926. Serial No. 140,672.

This invention relates to dye compounds. More particularly it relates to a new class of azo dye compounds and the process of preparing the same, which involves treating an amino azo compound with a carboxyl compound adapted to condense therewith.

The object of the invention is to produce a new class of dye compounds adapted to give on either animal or vegetable fibers shades of remarkable fastness to washing and to light. A further object is to produce dyes which, in addition to being fast, have excellent tinctorial power.

The new dyes may be represented by the general formula:

where R represents an aromatic radical not containing a hydroxyl or amino group attached to the nucleus, but which may or may not contain one or more azo groups, R' represents an aromatic radical not containing a hydroxyl or amino group attached to the nucleus, and R" represents hydrogen or an aliphatic or aromatic radical, or a substituted aliphatic or aromatic radical, such as for example, methyl, ethyl, phenyl, nitro-phenyl, amino-phenyl, hydroxy-phenyl, carboxy-phenyl, or phenyl-azo or disazo compounds.

Broadly stated, the process of preparing the new dyes involves diazotizing an aromatic amino or amino azo or disazo compound, coupling the diazo body to an aromatic compound which contains an amino group, but contains no hydroxyl group attached to the nucleus, and then treating with a carboxylic compound adapted to condense with the resulting amino azo compound and form therewith a product containing an acyl group. In case the acyl compound thus obtained contains an amino group, it may be diazotized and coupled to any suitable azo dye component.

The new dye compounds and their preparation can best be disclosed by the presentation of a number of examples of actual embodiments thereof. It is to be understood, of course, that these examples are furnished below by way of illustration only, and that the details of procedure specified therein, as well as the particular proportions, reagents, temperature, etc. therein disclosed are susceptible of variation and substitution.

The examples follows:

Example 1

Three hundred and three parts of 2-naphthylamine-6:8-disulphonic acid are diazotized in the usual way. To the diazo solution there is added a solution of 107 parts of meta-toluidine in 1000 parts of water and 120 parts of a 30% hydrochloric acid solution. The free mineral acid is neutralized by the addition of sodium acetate. The coupling will be complete after two to three hours' stirring at 20–25° C. The coupling is then brought back to mineral acid reaction by the addition of hydrochloric acid and the amido azo dye is salted out and filtered. This dye is soluble in alkaline solution with a bright yellowish color, but being very sensitive to acid, has no value either for animal or vegetable fiber. But by stirring the alkaline solution at 25–30° C. for several hours with 141 parts of benzoyl chloride, keeping enough soda ash during the whole operation to maintain a slight alkaline reaction, the dye is converted to its benzoyl compound, which is a bright yellow dye having good tinctorial power both on animal and vegetable fiber. It is no longer sensitive to acid and shows an excellent fastness to light. In its dry form it is an orange powder.

The dye has most probably the following formula:

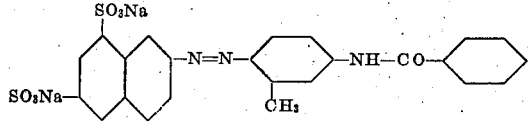

On reduction with stannous chloride it will yield 2-naphthyl-amine-6:8-disulphonic acid and 2-amino-5-benzoyl-amino-toluene.

Using acetic anhydride instead of benzoyl chloride the acetyl compound will be obtained, which has properties similar to the benzoyl compound.

Using 186 parts of p-nitro-benzoyl chloride instead of 141 parts of benzoyl chloride, but making the condensation at a temperature from 80–85° C. the nitro-benzoyl compound will be obtained, which has properties similar to the benzoyl derivative. The nitro product may be reduced with sodium sulphide or sulphhydrate and then will yield the amino-benzoyl compound, which now is capable of being again diazotized either in substance or on the fiber, and may be coupled with different coupling components, yielding various shades fast to washing and to light. For instance, development with phenyl-methyl-pyrazolone on the fiber will give a bright greenish-yellow, very fast to washing and to light; beta-naphthol will give a bright orange of similar properties.

Example 2

One hundred and seventy-three parts of p-sulphanilic acid are diazotized in the usual way. The diazo compound is coupled to 223 parts of 1:7-naphthylamine-sulphonic acid in the presence of sodium acetate to maintain a litmus acid reaction during the coupling. The coupling is stirred for three to four hours at 20-25° C., after which time it will be complete. The intermediate dye is salted out and filtered. It is stirred up with 4000 parts of water and converted to the soluble sodium salt by the addition of a solution of 40 parts sodium hydroxide. The solution is then acidified by 350 parts of 30% hydrochloric acid solution and diazotized at .15-20° C. with 69 parts of sodium nitrite. After stirring for about ½ hour the diazotization will be complete. There is now added to it a solution of 107 parts of meta-toluidine in 1000 parts of water and 120 parts of a 30% hydrochloric acid solution. The mineral acid reaction is neutralized with sodium acetate. The coupling is stirred over night at 20-25° C. It will be complete next morning. It is then acidified with hydrochloric acid, salted out, and filtered. The acid dye is stirred up with 4000 parts of water and is then converted to the soluble sodium salt by the addition of sodium carbonate. The solution of the sodium salt shows a dull reddish-violet shade, being very sensitive to acid, which turns the shade much bluer. By stirring the sodium salt solution at 20-25° C. for several hours with 141 parts of benzoyl chloride, keeping a soda alkalinity during the whole operation, the benzoyl compound will be obtained, which is in solution a bright orange-brown, not sensitive to acid. The dye is salted out and filtered. In its dry ground form it is a dark brown powder, which dyes cotton, wool, silk, and rayon in bright reddish-brown shades of an exceptional good fastness to light. The new dye has most probably the following formula:

On reduction with stannous chloride the following products will be obtained: p-sulphanilic acid, 1:4-naphthylenediamine-6-sulphonic acid, and 2-amino-5-benzoyl-aminotoluene.

The corresponding p-amino-benzoyl compound of this dye shows a slightly redder shade on direct dyeings compared to the benzoyl derivative. The beta-naphthol developed dyeings, however, turn much bluer and brighter, giving a full brownish-red, whereas phenyl-methyl-pyrazolone will yield yellower brown shades. All dyeings show an excellent fastness to light, the developed dyeings being in addition to that much faster to washing.

All dyeings of this class will give a pure white discharge with hydrosulphite.

Example 3

Three hundred and three parts of 2-naphthylamine-4:8-disulphonic acid (C-acid) are diazotized in the usual way. To the diazo solution there is added a solution of 137 parts of cresidine

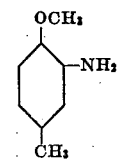

in 1000 parts of water and 120 parts of a 30% hydrochloric acid solution. The mineral acid reaction is neutralized with sodium acetate. After two to three hours stirring at 20-25° C. the coupling will be complete. After acidifying with hydrochloric acid the dye is salted out and filtered. After stirring the paste up with 4000 parts of water it is converted to the sodium salt by a solution of 40 parts of sodium hydroxide. The solution is then acidified with 350 parts of a 30% hydrochloric acid solution and diazotized with 69 parts of sodium nitrite. After stirring at 15-20° C. for about one hour the diazo will be complete. There is now added to the diazo mixture a solution of 107 parts meta-toluidine in 1000 parts of water and 120 parts of a 30%' hydrochloric acid solution. The mineral acid reaction is neutralized with sodium acetate. After stirring over night at 20-25° C. the coupling will be complete. The dye is heated to 70° C., acidified with hydrochloric acid, salted out, and filtered. The acid paste is stirred up with 5000 parts of water and then 200 parts of sodium carbonate are added, which converts the dye into its soluble sodium salt. One hundred and forty-one parts of benzoyl chloride are added

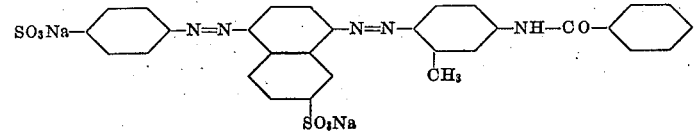

to the solution and the mixture is allowed to stir for three to four hours at 25–30° C. The shade of the mixture turns lighter and brighter and will, after the reaction is finished, represent a bright yellowish-orange solution not sensitive to acid. The dye is salted out and filtered. In its dry ground form it is an orange powder, soluble in water with a bright yellowish-orange color, dyeing animal and vegetable fibers in yellowish-orange shades, which show an excellent fastness to light. The dye has most probably the following formula:

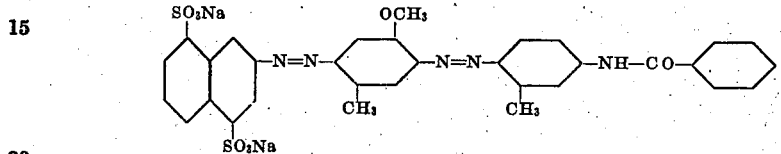

On reduction with stannous chloride it will yield the following compounds:
2 naphthalamine-4:8-disulphonic acid
2:5 diamino-1-methoxy-4-methyl-benzene

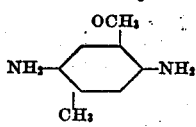

2-amino-5-benzoyl-amino-toluene

The corresponding p-amino-benzoyl compound instead of the benzoyl derivative is, in its dry form, a dark brownish-red powder, soluble in water with a yellowish-orange color; in concentrated sulphuric acid with a deep blue color. It dyes the animal and vegetable fibers in yellowish-orange shades, which by diazotization and development with beta-naphthol are turned to a bright yellowish-scarlet; with phenyl-methyl-pyrazolone to a brighter and yellower shade orange compared to the direct dyeing. All dyeings show an excellent fastness to light, giving a perfect white discharge with hydrosulphite.

*Example 4*

The unbenzoylated amino azo compound of Example 1

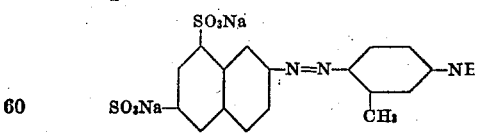

is dissolved with 4000 parts of water and then acidified with 350 parts of hydrochloric acid (30%). It is then diazotized at 10–15° C. with 69 parts of sodium nitrite. After stirring for about 30 minutes the diazotization will be complete. The diazo compound is added now to a solution of 223 parts of 1:6-naphthylamine-sulphonic acid containing sufficient sodium acetate to neutralize the mineral acid reaction. After two hours' stirring at 20–25° C. the coupling will be complete. It is acidified with 400 parts of hydrochloric acid (30%) and diazotized with 69 parts of sodium nitrite at 15–20° C. The diazotization will be complete after about 30 minutes. One hundred and seven parts metatoluidine, dissolved in 1000 parts of water and 120 parts of hydrochloric acid (30%), are then added to the diazo compound, the mineral acid reaction being neutralized with sodium acetate. The coupling is allowed to stir over night at 20–25° C. after which time it will be complete. It is acidified with hydrochloric acid, salted out, and filtered. The acid paste is stirred up with 5000 parts of water, converted to the soluble sodium salt by the addition of 250 parts of sodium carbonate, and benzoylated at 25–30° C. with 141 parts of benzoyl chloride. After stirring over night the benzoylation will be complete and the dye may be salted out and filtered. In its dry ground form it is a dark brown powder, soluble in water with a reddish-brown coloration, dyeing the animal and vegetable fibers in full reddish-brown shades, which show an excellent fastness to light. The dye has most probably the following formula:

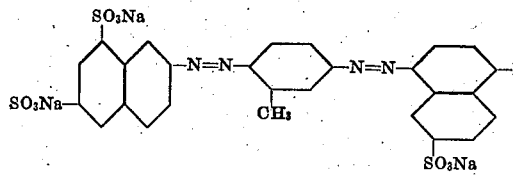

On reduction with stannous chloride the following compounds will be obtained: 2-naphthylamine-6:8-disulphonic acid, 2:5-diamino-toluene, 1:4-naphthylenediamine-6-sulphonic acid, and 2-amino-5-benzoyl-amino-toluene.

The corresponding p-amino-benzoyl derivative of this combination shows a similar shade on direct dyeings, but the beta-naphthol developed shade is bluer and brighter, whereas the pyrazolone developed shade is much yellower and brighter than the direct dyeing. The developed shades show a remarkable fastness to washing combined with an excellent fastness to light. All dyeings give a perfect white discharge with hydrosulphite.

Among other compounds which may be used as first components in addition to those named in the examples may be mentioned: aniline, the toluidines, xylidine, chloroaniline; aniline-sulphonic acids such as metanilic acid, chloro-aniline sulphonic acid, aniline-disulphonic acid; toluidine sulphonic acids such as para-toluidine-o-sulphonic acid, para-toluidine-m-sulphonic acid, ortho-toluidine-m-sulphonic acid, meta-xylidine sulphonic acid; naphthylamine-mono- and di-sulphonic acids such as 2-naphthylamine-8-sulphonic acid, 1-naphthylamine-4-sulphonic acid, 1-naphthylamine-5-sulphonic acid, 2-naphthylamine-3:6-disulphonic acid, 2-naphthylamine-3:8-disulphonic acid; the amino azo compound formed by coupling diazotized C-acid to m-toluidine, also the amino-benzoyl derivatives of aromatic amino-sulphonic acids, such as p-amino-benzoyl-1-aminobenzene-4-sulphonic acid, p-amino-benzoyl-2-amino-naphthalene-4:8-disulphonic acid, p-amino-benzoyl-p-amino-benzoyl-2-amino-naphthalene-6:8-disulphonic acid, and the amino-benzoyl derivatives of amino azo compounds, such as the p-amino-benzoyl derivative of the combination formed by coupling diazotized 2-naphthylamine-6:8-disulphonic acid to meta-toluidine.

Among other compounds which may be used as middle components in addition to those named in the examples may be mentioned: aniline, para-xylidine, ortho-anisidine, alpha-naphthylamine, etc.

Among compounds which may be used as end components may be named the acyl halides, the carboxylic acids, and the carboxylic acid anhydrides.

It is to be understood, where the terms "aromatic radical" and "aliphatic radical" are employed in the appended claims, that these terms are employed in their broad sense and include substituted aromatic and aliphatic radicals.

We claim:

1. A dye compound comprising the group:
R—N=N—R'—NH—CO—R''
in which R and R' represent aromatic radicals having neither a hydroxyl nor an amino substituent, and CO—R'' represents an acyl radical not contaning a ketone group.

2. A dye compound comprising the group:
R—N=N—R'—NH—CO—R''
in which R and R' represent aromatic radicals having neither a hydroxyl nor an amino substituent, and R'' represents either hydrogen, an aromatic radical or an aliphatic radical not containing a ketone group.

3. A dye compound comprising the group:
R—N=N—R'—NH—CO—R''
wherein R represents the residue of an aromatic compound containing neither a hydroxyl group nor an amino group nor the residue of an acyl acetic acid derivative, R' represents a residue of an aromatic compound having neither an amino nor a hydroxyl group and CO—R'' represents an acyl radical not containing a ketone group.

4. A dye compound comprising the group:
R—N=N—R'—NH—CO—R''
wherein R and R' represent aromatic radicals having neither a hydroxyl nor an amino substituent, but wherein the group R—N=N—R' contains a sulfonic acid group and wherein CO—R'' represents an acyl radical.

5. A dye compound comprising the group:
R—N=N—R'—NH—CO—R''
wherein R and R' represent aromatic radicals having neither a hydroxyl nor an amino substituent, wherein R contains a sulfonic acid group and wherein CO—R'' represents an acyl radical.

6. A dye compound comprising the group:
R—N=N—R'—NH—CO—R''
wherein R and R' represent aromatic radicals having neither a hydroxyl nor an amino substituent, wherein R contains an azo group and wherein CO—R'' represents an acyl radical.

7. A dye compound comprising the group:
R—N=N—R'—NH—CO—R''
wherein R and R' represent aromatic radicals having neither a hydroxyl nor an amino substituent, wherein R contains an azo group and a sulfonic acid group and wherein CO—R'' represents an acyl radical.

8. A dye compound comprising the group:
R—N=N—R'—NH—CO—R''
wherein R and R' represent aromatic radicals having neither a hydroxyl nor an amino substituent, wherein R contains two azo groups and wherein CO—R'' represents an acyl radical.

9. A dye compound comprising the group:
R—N=N—R'—NH—CO—R''
wherein R and R' represent aromatic radicals having neither a hydroxyl nor an amino substituent, wherein R' contains an alkyl substituent and where CO—R'' represents an acyl radical.

10. A dye compound having the following structural formula:

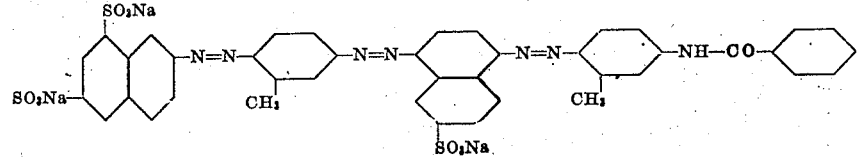

11. Textile material dyed with a compound of the type set forth in claim 1.

12. A dye compound comprising the group:

R—N=N—R'—NH—CO—R'' in which R and R' represent aromatic radicals having neither a hydroxyl nor an amino group attached to the aryl nucleus, and R'' rpresents an aromatic radical.

13. The compound set forth in claim 2 wherein R'' contains an amino group.

14. The process of preparing a dye compound which comprises treating an aromatic amino azo compound containing no hydroxy group with a carboxylic compound adapted to condense therewith and form a product containing an acyl group.

15. The process of preparing a dye compound which comprises diazotizing an aromatic amino compound which does not contain a hydroxyl group attached to the nucleus, coupling the resulting diazo body to a compound containing an amino group but not containing a hydroxyl group, and then treating the resulting amino azo compound with a carboxylic compound adapted to condense therewith and form a product containing an acyl group.

16. The process of preparing a dye compound which comprises diazotizing an aromatic amino compound which does not contain a hydroxyl group attached to the nucleus, coupling the resulting diazo body to a compound containing an amino group but not containing a hydroxyl group, and then treating the resulting amino azo compound with a compound having the general formula:

A—CO—R'' wherein A is a halide, a hydroxy group, or an acyl-oxide group, and R'' represents either hydrogen, an aromatic radical or an aliphatic radical.

17. The process of preparing a dye which comprises treating a sulphonated hydroxy-free-aryl-amino-azo compound with a carboxylic compound adapted to condense therewith and form a product containing an acyl group.

18. The process of preparing a dye compound which comprises diazotizing an aromatic amino compound containing an azo group but which does not contain a hydroxyl group attached to the nucleus, coupling the resulting diazo body to a compound containing an amino group but not containing a hydroxyl group, and then treating the resulting amino disazo compound with a carboxylic compound adapted to condense therewith and form a product containing an acyl group.

19. The process of preparing a dye compound which comprises diazotizing an aromatic sulphonated amino compound containing an azo group but which does not contain a hydroxyl group attached to the nucleus, coupling the resulting diazo body to a compound containing an amino group but not containing a hydroxyl group, and then treating the resulting amino disazo compound with a carboxylic compound adapted to condense therewith and form a product containing an acyl group.

20. The process set forth in claim 15 wherein the carboxylic compound is an aryl compound.

21. The process set forth in claim 15 wherein the carboxylic compound is an aryl chloride.

22. The process set forth in claim 15 wherein the carboxylic compound is nitro benzoyl chloride and the nitro group of the resulting condensation product is thereafter reduced to an amino group.

In testimony whereof we affix our signatures.

EMMET F. HITCH.
HENRY JORDAN.